United States Patent
Grande Collado et al.

(10) Patent No.: US 10,118,569 B2
(45) Date of Patent: Nov. 6, 2018

(54) PROCESS FOR MANUFACTURING VEHICLE HEADLINERS

(71) Applicant: GRUPO ANTOLÍN-INGENIERÍA, S. A., Burgos (ES)

(72) Inventors: Miguel Ángel Grande Collado, Burgos (ES); Francisco Javier Merino Rojo, Burgos (EA)

(73) Assignee: GRUPO ANTOLÍN-INGENIERÍA, S. A., Burgos (ES)

( * ) Notice: Subject to any disclaimer, the term of this patent is extended or adjusted under 35 U.S.C. 154(b) by 62 days.

(21) Appl. No.: 15/158,980

(22) Filed: May 19, 2016

(65) Prior Publication Data
US 2016/0347264 A1 Dec. 1, 2016

(30) Foreign Application Priority Data
May 25, 2015 (EP) .................................... 15382276

(51) Int. Cl.
| | | |
|---|---|---|
| *B60R 13/02* | (2006.01) | |
| *B29C 51/16* | (2006.01) | |
| *B29K 105/00* | (2006.01) | |
| *B29C 51/08* | (2006.01) | |
| *B29C 51/14* | (2006.01) | |
| *B29K 101/10* | (2006.01) | |

(52) U.S. Cl.
CPC ........ B60R 13/0218 (2013.01); B29C 51/165 (2013.01); *B29C 51/082* (2013.01); *B29C 51/14* (2013.01); *B29K 2101/10* (2013.01); *B29K 2105/0097* (2013.01)

(58) Field of Classification Search
CPC ... B60R 13/0218; B29C 51/082; B29C 51/14; B29C 51/165; B29K 2105/0097; B29K 2101/10
See application file for complete search history.

(56) References Cited

U.S. PATENT DOCUMENTS

| | | | | |
|---|---|---|---|---|
| 4,210,572 A | * | 7/1980 | Herman | ............... C08K 9/04 523/200 |
| 5,087,311 A | * | 2/1992 | Elliott | ............... B29C 66/729 156/212 |
| 2007/0155859 A1 | * | 7/2007 | Song | ............... C08G 18/10 523/218 |
| 2009/0039556 A1 | * | 2/2009 | Sawada | ............... B29C 51/082 264/319 |

FOREIGN PATENT DOCUMENTS

| | | | |
|---|---|---|---|
| CN | 1382195 A | 11/2002 | |
| EP | 0072684 A1 | 2/1983 | |
| EP | 1013414 A2 * | 6/2000 | ............ B32B 3/266 |
| EP | 1013414 A2 | 6/2000 | |
| ES | 8400291 A1 | 1/1984 | |
| WO | 2011043119 A1 | 4/2011 | |

OTHER PUBLICATIONS

Extended European Search Report—EP 15382276.2—dated Jan. 12, 2015.

\* cited by examiner

*Primary Examiner* — Vishal I Patel

(74) *Attorney, Agent, or Firm* — Banner & Witcoff, Ltd.

(57) ABSTRACT

Manufacturing process for vehicle headliners comprising a substrate and at least one decorative lining extending along one of the faces of said substrate, joined to each other through a layer of adhesive, which specifically comprises the union of the decorative lining to the previously shaped substrate using a thermosetting adhesive with a high viscosity.

4 Claims, 2 Drawing Sheets

PROCESS FOR MANUFACTURING VEHICLE HEADLINERS

CROSS-REFERENCE TO RELATED APPLICATIONS

The present application claims priority to Application EP 15382276.2, filed May 25, 2015. Benefit of the filing date of this prior application is hereby claimed. The prior application is hereby incorporated by reference in its entirety.

TECHNICAL FIELD OF THE INVENTION

The present invention relates to a process for manufacturing vehicle headliners, which comprise a substrate and at least one decorative lining extending along one of the faces of said substrate, joined by a layer of adhesive.

Specifically, the manufacturing process of the invention considers the process for joining a decorative lining to a previously shaped substrate by the use of a thermosetting adhesive with high viscosity.

BACKGROUND OF THE INVENTION

The application of decorative linings on a previously shaped substrate is a common and necessary action for providing the decorative finish to said substrate shaped to define a headliner. Consequently, the decorative lining has a mainly aesthetic function.

To fulfil said aesthetic function it is necessary to ensure proper adhesion throughout the entire contact surface between the decorative lining and the shaped substrate, while preventing the decorative lining from getting dirty during the joining process.

The conventional way to prevent the decorative lining from getting dirty is to reduce the exposure thereof to the adhesive by applying said adhesive on the shaped substrate instead of on said decorative lining. One example in which this solution is shown is patent ES-8400291.

Since the shaped substrate has a three-dimensional shape, normally with complex shapes, it is necessary to use adhesive application methods that allow the adhesive to reach all of the surface that will be in contact with the decorative lining.

The most common method comprises applying the adhesive by spraying, which requires using liquid adhesives with low viscosity by adding a solvent to the adhesive, normally water or an organic solvent.

Despite the low viscosity of the liquid adhesive, the application on a shaped substrate with low porosity allows an optimum use thereof, which is not the case when applied on a decorative lining which, due to its porosity, absorbs part of the adhesive reducing the effectiveness thereof, and potentially even leading to a transfer of the adhesive with the resulting soiling of the decorative lining.

One of the drawbacks of spraying the adhesive on the three-dimensional shaped substrate is achieving a sufficient distribution of the adhesive to obtain good adherence, which also lasts for the useful lifetime of the headliner. This requires applying excess adhesive. Specifically, the resulting adhesive layer, after the adhesive has set, in the headliner obtained has a grammage of 60 to 80 $g/m^2$.

Another drawback of the use of liquid adhesives is the need to remove the solvent once the adhesive has been applied to the shaped substrate.

Specifically, in the case of thermosetting liquid adhesives comprising volatile organic compounds as solvent, it is necessary to provide an additional installation for capturing and treating said volatile organic compounds, increasing the cost and complexity of use of this type of thermosetting liquid adhesives.

In the case of thermosetting liquid adhesives in which the solvent is water, although this avoids the problem of emission and treatment of volatile organic compounds, it has be drawback of requiring a drying chamber for eliminating the water contained in the adhesive after application on the shaped substrate.

In view of the above, the subject matter of the invention consists in a process for manufacturing vehicle headliners, and specifically a process for joining a decorative lining to a shaped substrate by the use of a thermosetting adhesive, wherein a control is established of the adhesive application by a sufficient distribution thereof, resulting in proper adhesion throughout the entire contact surface between the two components that is lasting and prevents soiling the decorative lining, such that the achievement of the said objectives does not increase the cost of the installation or the materials used to perform the adhesion between the decorative lining and the shaped substrate.

DESCRIPTION OF THE INVENTION

The present invention is defined and characterised by the independent claims, while the dependent claims describe additional features thereof.

The use of a thermosetting adhesive with a high viscosity to join a shaped substrate and a decorative lining allows application of the adhesive directly on the decorative lining, that is, application on a flat element, without the adhesive being absorbed.

This allows a proper distribution of the thermosetting adhesive on the decorative lining that ensures a lasting adhesion of said decorative lining on the shaped substrate throughout the entire contact surface.

In this way the amount of thermosetting adhesive deposited is controlled, adjusting it to the minimum amount needed.

As a result, practically all of the thermosetting adhesive applied is used, and the transfer of the adhesive is prevented, thereby preventing one of the ways in which said decorative lining can become dirty.

The absence of solvents in the adhesive avoids the need to eliminate said solvents and the installation required to perform this.

DESCRIPTION OF THE DRAWINGS

The present specification is complemented by a set of figures that illustrate a preferred embodiment, in no way limiting the invention.

DETAILED DESCRIPTION

Figure 1:
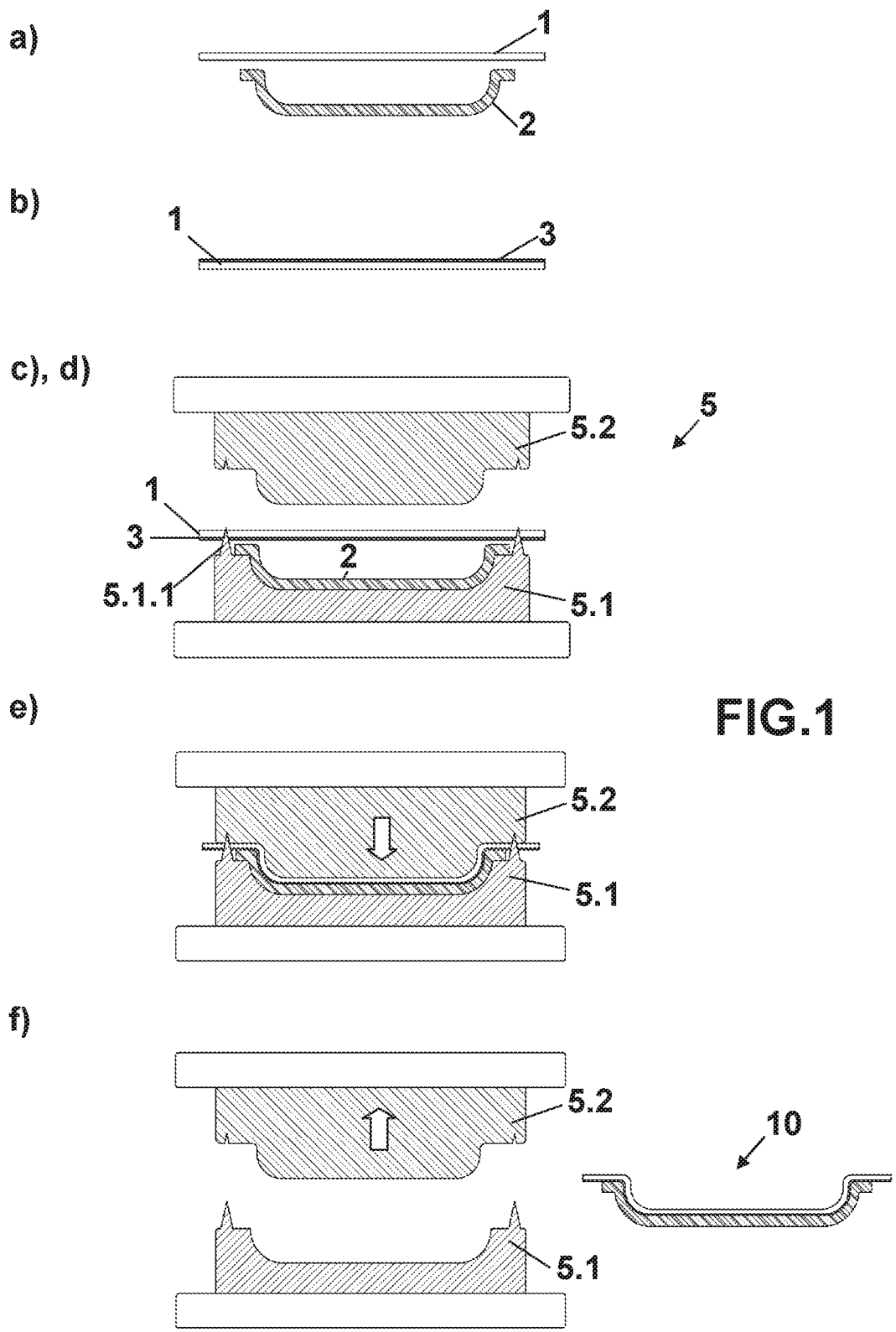
FIG. 1 shows a schematic view of the stages of the headliner manufacturing process.

The headliner manufacturing process begins with stage a), which comprises arranging a previously shaped substrate (2) and a decorative lining (1).

Said shaped substrate (2) consists of one or several layers and has a mainly structural function, that is, supporting the typical loads of a headliner first during its handling, and then during the lifetime thereof when assembled on the vehicle.

The layer or layers forming said shaped substrate (2) can be shaped for example by thermoforming processes, that is, using processes in which heat and pressure are applied simultaneously, or by forming processes using pressure. In both cases the objective is to obtain a specific geometry.

The decorative lining (1) forms the visible face of the headliner (10) when assembled in the vehicle, and therefore has a decorative function.

Said decorative lining (1) can comprise several materials and structures commonly employed in the field of vehicle headliners.

After arranging the main components of the structure of the headliner (10) the next stage of the process begins, stage b), which involves applying a layer of thermosetting adhesive (3) with a Brookfield viscosity between 1000 and 2500 mPa·s measured at 25° with a No. 3 spindle and rotational speed of 20 rpm on the decorative lining (1) to join the shaped substrate (2) and the decorative lining (1) in a subsequent stage.

The thermosetting adhesive layer (3) is applied with adhesive application means (4) allowing a controlled and even distribution of adhesives with high viscosity.

Figure 2:
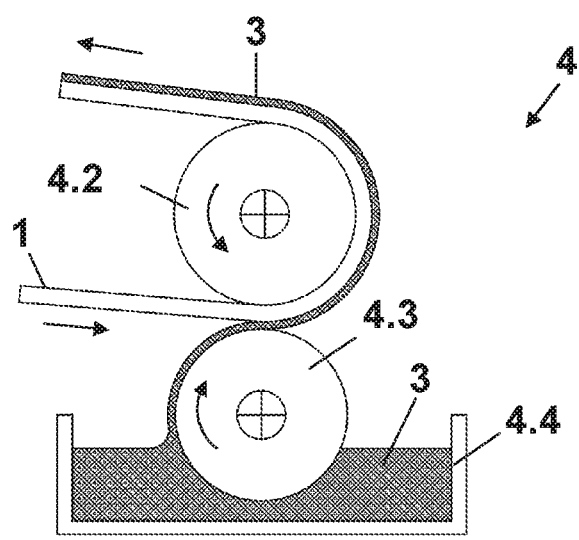
FIG. 2 shows a method for applying high-viscosity thermosetting adhesive to the decorative lining.

Specifically, FIG. 2 shows an example of adhesive application means (4) comprising adhesive application rollers (4.2, 4.3) consisting of a first roller (4.3) for adhesive dosing in contact with the thermosetting adhesive contained in a vessel (4.4) for application on the decorative lining (1) which moves between said first dosing roller (4.3) and a second support roller (4.2), in order to apply a layer of thermosetting adhesive (3) on the decorative lining (1) with a controlled and even thickness.

Another example, not shown, can comprise a "doctor blade" that controls the deposition of thermosetting adhesive on the decorative lining (1), making the adhesive flow as a continuous sheet with the aid of said blade in order to deposit a layer of thermosetting adhesive (3) on the decorative lining (1) in an even and controlled manner.

After applying the layer of thermosetting adhesive (3) on the decorative lining (1), stage c) is performed which involves introducing the shaped substrate (2) in a thermoforming mould (5).

Said thermoforming mould (5), the shape of which corresponds to that of the shaped substrate (2), comprises a first mould half (5.1) and a second mould half (5.2) and is at a temperature between 110 and 150° C.

Stage d) then begins, comprising introducing the decorative lining (1) with the layer of thermosetting adhesive (3) applied in stage b) on the shaped substrate (2) such that the layer of thermosetting adhesive (3) is in front of the shaped substrate (2).

For this purpose, the second mould half (5.1) can include stretching means (5.1.1) for the decorative lining (1) to ensure sufficient tautness thereof. In this way, when the mould is closed the appearance of wrinkles on said decorative lining (1) is prevented.

The next stage e) comprises closing the thermoforming mould (5) and applying pressure on the decorative lining (1) and the shaped substrate (2) to join the two with the layer of thermosetting adhesive (3) by the combined application of heat and pressure.

In stage e) the decorative lining (1) is stretched and is adjusted to the geometry of the shaped substrate in order to establish the union of the two throughout the entire contact surface.

Finally, stage f) comprises opening the thermoforming mould (5) and removing the headliner (10) with a specific geometry.

Preferably, the resulting adhesive layer, once the adhesive has set, in the headliner obtained has a grammage of 10 to 35 $g/m^2$, confirming the reduction in adhesive material used in the manufacturing process of the invention.

The invention claimed is:

1. Process for manufacturing vehicle headliners comprising the following stages:
   a) arranging a previously shaped three-dimensional substrate and a decorative lining;
   b) applying a layer of thermosetting adhesive with a Brookfield viscosity between 1000 and 2500 mPa·s measured at 25° C. with a no. 3 spindle and rotational speed of 20 rpm on the decorative lining;
   c) introducing the shaped three-dimensional substrate in a thermoforming mould at a temperature between 110 and 150° C.; wherein a predetermined shape of the thermoforming mould corresponds to the previously shaped three-dimensional substrate;
   d) introducing the decorative lining together with the layer of thermosetting adhesive on the shaped three-dimensional substrate such that the layer of thermosetting adhesive is in front of the shaped three-dimensional substrate;
   e) closing the thermoforming mould and applying pressure to establish the union between the decorative lining and the shaped three-dimensional substrate through the layer of thermosetting adhesive;
   f) opening the thermoforming mould and extracting the headliner.

2. Process for manufacturing vehicle headliners according to claim 1, wherein the adhesive application stage b) is performed using adhesive application rollers.

3. Process for manufacturing vehicle headliners according to claim 1, wherein the layer of thermosetting adhesive after setting on the headliner obtained in stage f) has a grammage of 10 to 35 $g/m^2$.

4. Process for manufacturing vehicle headliners according to claim 1, wherein said stage d) further comprises stretching the decorative lining so that the lining remains taut.

* * * * *